United States Patent
Hartman

(10) Patent No.: US 6,374,763 B1
(45) Date of Patent: Apr. 23, 2002

(54) BLOW MOLDED DOCK FLOAT

(75) Inventor: Robert G. Hartman, Greensboro, NC (US)

(73) Assignee: Flotation Devices, Inc., Reidsville, NC (US)

( * ) Notice: Subject to any disclaimer, the term of this patent is extended or adjusted under 35 U.S.C. 154(b) by 0 days.

(21) Appl. No.: 09/505,401

(22) Filed: Feb. 16, 2000

(51) Int. Cl.$^7$ .............................................. B63B 35/44

(52) U.S. Cl. ...................... 114/263; 114/267

(58) Field of Search ................... 114/263, 265, 114/266, 267, 61.1, 352, 357

(56) References Cited

U.S. PATENT DOCUMENTS

| | | | | |
|---|---|---|---|---|
| 3,752,102 A | | 8/1973 | Shuman | 114/5 F |
| 4,157,695 A | | 6/1979 | Knutsen | 114/267 |
| 4,365,577 A | | 12/1982 | Heinrich | 144/267 |
| 4,418,634 A | * | 12/1983 | Gerbus | 114/263 |
| 4,559,891 A | | 12/1985 | Shorter, Jr. | 114/263 |
| 4,655,156 A | | 4/1987 | Svirklys et al. | 114/266 |
| 4,683,833 A | * | 8/1987 | Meriwether | 114/267 |
| 4,709,647 A | | 12/1987 | Rytand | 114/267 |
| 4,768,456 A | * | 9/1988 | Jones et al. | 114/266 |
| 4,799,445 A | | 1/1989 | Meriwether | 114/267 |
| 4,974,538 A | * | 12/1990 | Meriwether | 114/357 |
| 5,036,789 A | * | 8/1991 | Kelly et al. | 114/357 |
| 5,199,370 A | * | 4/1993 | Berquist | 114/263 |
| 5,261,346 A | * | 11/1993 | Updyke | 114/352 |
| 5,281,055 A | * | 1/1994 | Neitzke et al. | 114/263 |
| 5,915,325 A | * | 6/1999 | Gerber et al. | 114/263 |
| 6,035,797 A | * | 3/2000 | Robinson | 114/263 |

FOREIGN PATENT DOCUMENTS

DE          2351314          4/1975

* cited by examiner

Primary Examiner—Stephen Avila
(74) Attorney, Agent, or Firm—MacCord Mason PLLC

(57) ABSTRACT

A molding apparatus. The apparatus includes a preformer for supplying a predetermined amount of molten material and an asymmetrical core for receiving the molten material. The asymmetrical core includes a first cavity and a second, female cavity, wherein the depth ratio of the second cavity to the first cavity is greater than about 4. A movable bottom plate in the second cavity varies the depth ratio of the second cavity. A pressure differential system is connected to the asymmetrical core for forming the molten material inside the asymmetrical core. The apparatus of the present invention is particularly well suited for forming a blow molded float for a floating dock system. In the preferred embodiment, the floating dock system includes a docking surface and at least one blow molded float. The blow molded float preferably has at least four sides; a thickened top mounting surface; and a bottom joined to the thickened top mounting surface by the sides. The sides, the bottom and thickened top mounting surface form an internal cavity. Also, in the preferred embodiment, at least one of the sidewalls is substantially taper-free and an interlocking coupling for joining a plurality of adjacent blow molded floats to one another. Preferably, the interlocking coupling is a tongue-in-groove system and each of the blow molded floats includes the tongue-in-groove system to allow a plurality of blow molded floats to be interconnected to one another. Specifically, a first side of one of the blow molded floats includes a male tongue portion, the male portion being mateable with an opposing female groove disposed on one of the sides of an adjacent blow molded float. Because the present invention permits the sidewalls to be formed substantially taper-free, the male tongue portion and the opposing female groove are substantially taper free which otherwise would be unworkable.

41 Claims, 11 Drawing Sheets

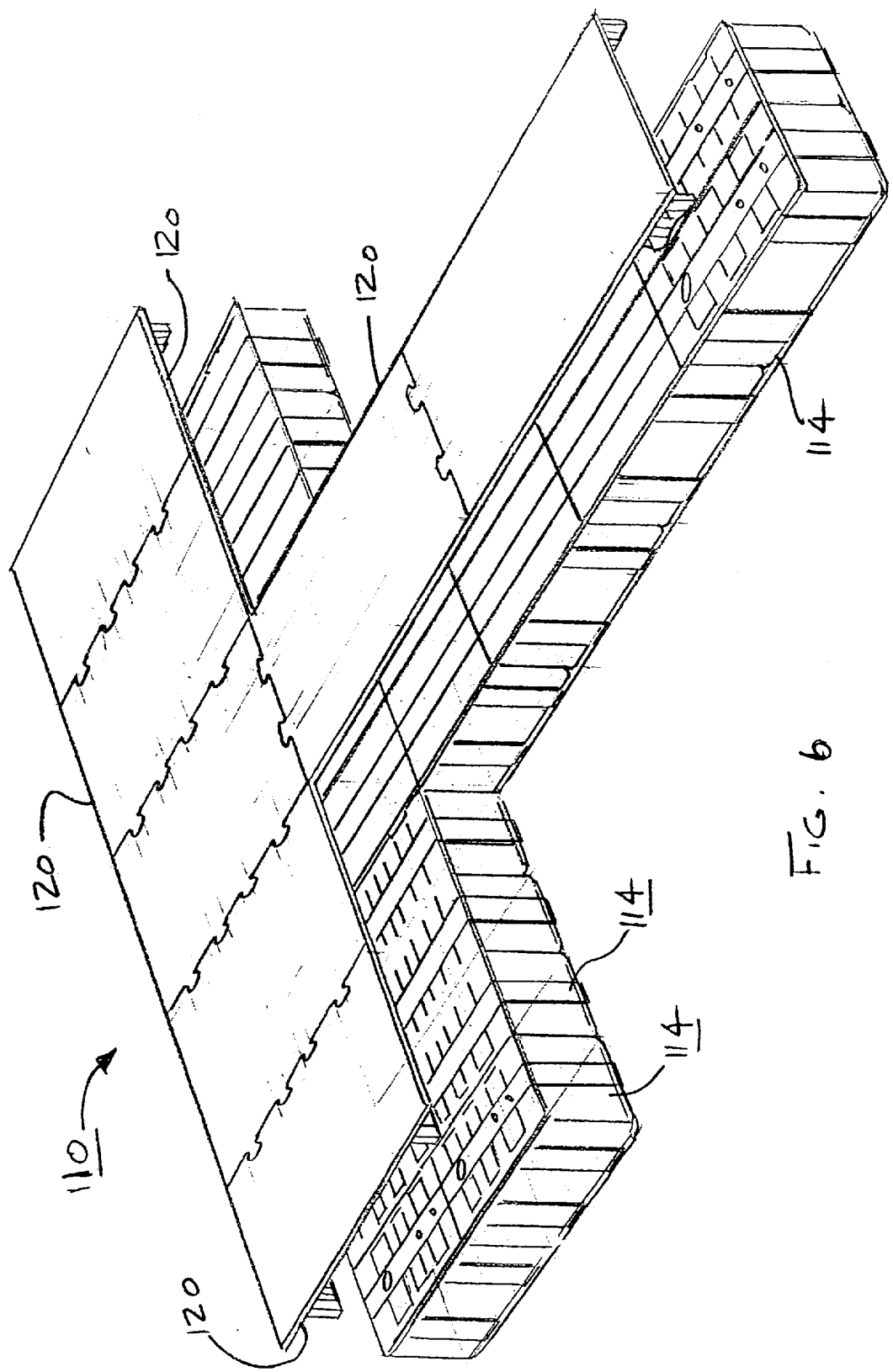

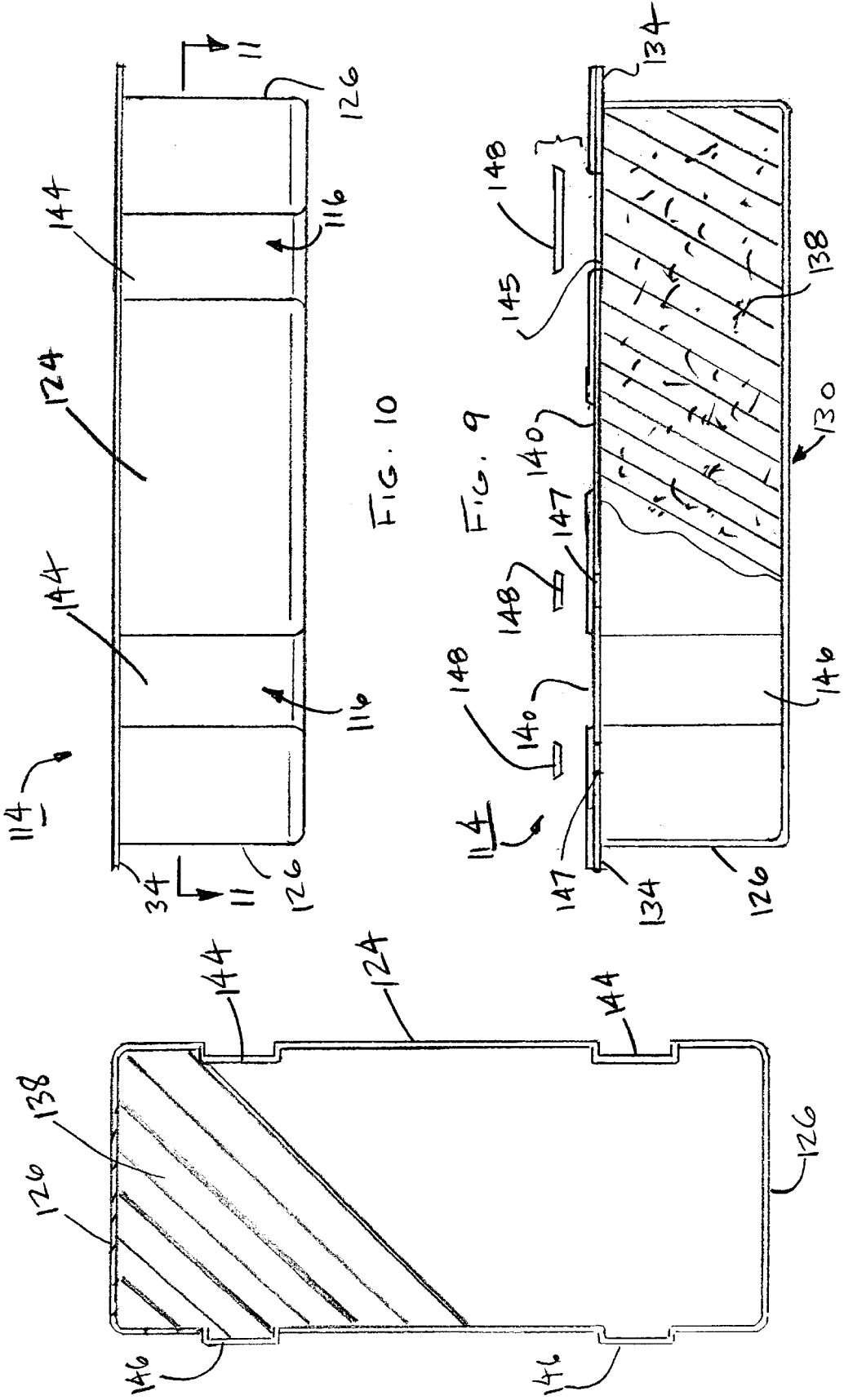

FIG. 13

BLOW MOLDED DOCK FLOAT

BACKGROUND OF THE INVENTION (1) Field of the Invention

The present invention relates generally to blow molded floats for floating docking and, more particularly, to a method and apparatus for blow molding an asymmetrically shaped dock float having an integrally formed mounting flange and a floating dock system supported by interlocking blow molded floats.

(2) Description of the Prior Art

Hollow drums constructed of metal or plastic had been used to float docks and swim platforms for many years. Plastic drums are preferred because they do not easily rust and they resist attack by gasoline and other marine chemicals. One such drum system is shown in U.S. Pat. No. 4,799,445 issued Jan. 24, 1989 to Meriwether. This patent is hereby incorporated by reference by its entirety.

However, the means which have been used to attach plastic floats have been less than always successful because most plastic molding operations require high symmetry in the molding process. One of the most desirable geometries for attaching a float to a dock structure would be to form a mounting flange along the top of a float. This can be done relatively easily in shallow molding operations of less than about 12 inches. However, to provide maximum buoyancy, it is highly desirable to have a float depth of greater then about 20 inches.

Blow molding of thermoplastic flanged forms had been limited to forms having less than about 12 inches of depth. This is due because the amount of material that can be drawn to form a float with a flange is limited. The creation of a flange near the parting line of the mold core limits the amount of material that can be drawn into the other side of the mold. This limitation is sometimes called draw ratio or depth ratio. Blow and vacuum molding is generally limited to a depth ratio of about 4.

However, for the manufacture of high volumes of molded parts, blow molding offers substantial economic savings over other techniques of molding plastic parts. Specifically, the cycle time and labor of blow molding is substantially less than vacuum molding, twin sheet molding and rotational molding. Also, the raw materials used to form an article in blow molding are cheaper than the materials used in vacuum and twin sheet molding since solid pellets of material can be used rather than preformed sheets of material. In addition, most rotational molding operations require finely ground raw material rather than larger pellets to ensure that the material moves freely within the mold. Consequently, blow molding may be about 50 percent less expensive then competitive molding processes.

Thus, there remains a need for a new and improved molding apparatus which is able to form a flange along at least one side of a molded float while, at the same time, is able to form a molded float having a depth ratio of greater than about 4 without the thinning problems associated with such articles in the past.

SUMMARY OF THE INVENTION

The present invention is directed to a molding apparatus. The apparatus includes a preformer for supplying a predetermined amount of molten material, such as a thermoplastic resin, to an asymmetrical core. A parison former is located between the preformer and the asymmetrical core for forming a tube from the molten material. In the preferred embodiment, the parison former includes an outer die and an internal mandrel. The spacing between the outer die and the inner mandrel may be varied or asymmetrical and co-aligned with the asymmetrical core to help provide additional molten material where most needed.

The preformer may also include a pump or an extruder for preheating and sending the molten material to an accumulator which receives enough material for forming a molded article. A pusher attached to the accumulator ejects the preform from the accumulator into the open asymmetrical core.

The asymmetrical core includes a first cavity and a second, female cavity, wherein the depth ratio of the second cavity to the first cavity is greater than about 4. The first cavity may be substantially flat or include a female portion and/or a male portion such as when a waffle surface is desired to further strengthen the surface of the molded article.

A pressure differential system is connected to the asymmetrical core forming the molten material inside the asymmetrical core. The pressure differential system includes a pressurized gas source and may include a vacuum source for helping to form the molded article.

In the preferred embodiment, a movable bottom plate in the second cavity varies the depth ratio of the second cavity. This enables a molded article to be formed having a depth ratio substantially greater than 4. The movable bottom plate includes a returning means, such as a hydraulic cylinder, which may help eject the molded article and at least one stop for maintaining the movable bottom plate at a predetermined depth.

Accordingly, one aspect of the present invention is to provide a molding apparatus. The apparatus includes a preformer for supplying a predetermined amount of molten material; an asymmetrical core for receiving the molten material, wherein the asymmetrical core includes a first cavity and a second female cavity, wherein the depth ratio of the second cavity to the first cavity is greater than about 4; and a pressure differential system connected to the asymmetrical core for forming the molten material inside the asymmetrical core.

Another aspect of the present invention is to provide a core for a molding apparatus. The apparatus includes: a first cavity; a second, female cavity, wherein the depth ratio of the second cavity to the first cavity is greater than about 4; and a movable bottom plate in the second cavity for varying the depth ratio of the second cavity.

Still another aspect of the present invention is to provide a molding apparatus. The apparatus includes a preformer for supplying a predetermined amount of molten material; an asymmetrical core for receiving the molten material, wherein the asymmetrical core includes a first cavity and a second, female cavity, wherein the depth ratio of the second cavity to the first cavity is greater than about 4; and a movable bottom plate in the second cavity for varying the depth ratio of the second cavity; a pressure differential system connected to the asymmetrical core for forming the molten material inside the asymmetrical core; and a parison former located between the preformer and the asymmetrical core for forming a tube from the molten material.

The apparatus of the present invention is particularly well suited for forming a blow molded float for a floating dock system. In the preferred embodiment, the floating dock system includes a docking surface and at least one blow molded float. The blow molded float preferably has at least four sides; a thickened top mounting surface; and a bottom joined to the thickened top mounting surface by the sides. The sides, the bottom and thickened top mounting surface form an internal cavity.

Also, in the preferred embodiment, at least one of the sidewalls is substantially taper-free and an interlocking coupling means for joining a plurality of adjacent blow molded floats to one another. Preferably, the interlocking coupling means is a tongue-in-groove system and each of the blow molded floats includes the tongue-in-groove system to allow a plurality of blow molded floats to be interconnected to one another. Specifically, a first side of one of the blow molded floats includes a male tongue portion, the male portion being mateable with an opposing female groove disposed on one of the sides of an adjacent blow molded float. Because the present invention permits the sidewalls to be formed substantially taper-free, the male tongue portion and the opposing female groove are substantially taper free. Such an arrangement on tapered sidewalls would be unworkable.

The docking surface includes planking and may further include stringers for attaching the planking to the blow molded floats. The stringers may extend vertically from the planking for added strength. The docking surface may also include sheeting instead of planking. Preferably, adjacent pieces of the sheeting are joined along at least one common interlocking edge. In either case, the docking surface is selected from a variety of water and weather resistant materials, such as marine plywood, rigid plastic sheeting, a vinyl sheet or a composite.

Because of symmetry requirements, the blow molded float is preferably a rectangular-shaped, hollow solid. More preferably, the blow molded float has a width dimension of about 2 feet, a length dimension of about 4 feet and a depth of about 20 inches. This allows pairs of blow molded floats to form a 4 foot by 4 foot surface useful, for example, for a swimming rest float.

In the preferred embodiment, the thickened top mounting surface further includes an integrally molded flange, the integrally molded flange extending horizontally beyond at least one of the sidewalls. Such an arrangement has not been previously possible, as will become apparent below. The integrally molded flange extends horizontally beyond at least two of the sidewalls and, preferably, extends horizontally beyond at least three of the sidewalls. This overlapping U-shape allows a string of floats to be attached to one another.

Blow molded objects are inherently air tight unless punctured but this can easily happen to a floating dock. Accordingly, in the preferred embodiment, the cavity is filled with a low-density filling such as closed cell, expandable polystyrene foam.

The thickened top mounting surface may further include ribbing to prevent warping of the thickened top mounting surface during molding and a utility channel or channels.

Accordingly, one aspect of the present invention is to provide a floating dock system. The floating dock system includes a docking surface; and at least one blow molded float, the blow molded float having at least four sides; a thickened top mounting surface; and a bottom joined to the thickened top mounting surface by the sides, wherein the sides, the bottom and thickened top mounting surface form an internal cavity.

Another aspect of the present invention is to provide a floating dock system. The floating dock system includes a docking surface; and at least one blow molded float, the blow molded float having at least four sides; a thickened top mounting surface; and a bottom joined to the thickened top mounting surface by the sides, wherein the sides, the bottom and thickened top mounting surface form an internal cavity and wherein at least one of the sidewalls is substantially taper-free.

Still another aspect of the present invention is to provide a floating dock system. The floating dock system includes a docking surface; at least one blow molded float, the blow molded float having at least four sides; a thickened top mounting surface; and a bottom joined to the thickened top mounting surface by the sides, wherein the sides, the bottom and thickened top mounting surface form an internal cavity and wherein at least one of the sidewalls is substantially taper-free; and an interlocking coupling means for joining a plurality of adjacent blow molded floats to one another.

These and other aspects of the present invention will become apparent to those skilled in the art after a reading of the following description of the preferred embodiment when considered with the drawings.

BRIEF DESCRIPTION OF THE DRAWINGS

FIG. 6 is an exploded top perspective view of a docking surface and coupled blow molded floats constructed according to the present invention;

FIG. 9 is a cross-sectional side view of the blow molded float shown in FIG. 8, taken along lines 9—9;

FIG. 10 is a side view of the blow molded float shown in FIG. 8;

FIG. 11 is a cross-sectional top view of the blow molded float shown in FIG. 10, taken along lines 11—11;

Figure 13:
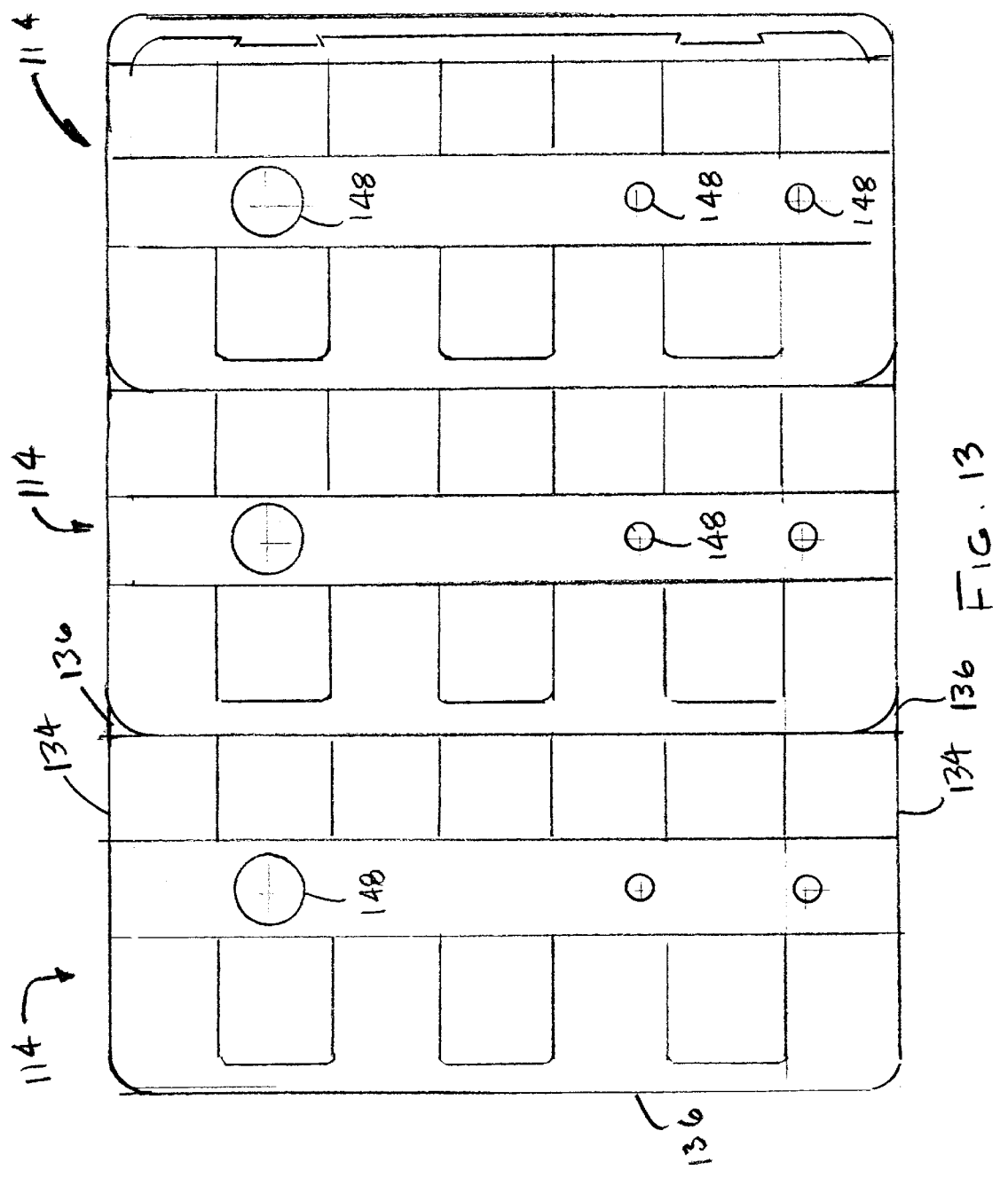

FIG. 13 is a top view of three individual float units coupled together, similar to the two individual float units shown in FIG. 7.

DESCRIPTION OF THE PREFERRED EMBODIMENTS

Figure 1:
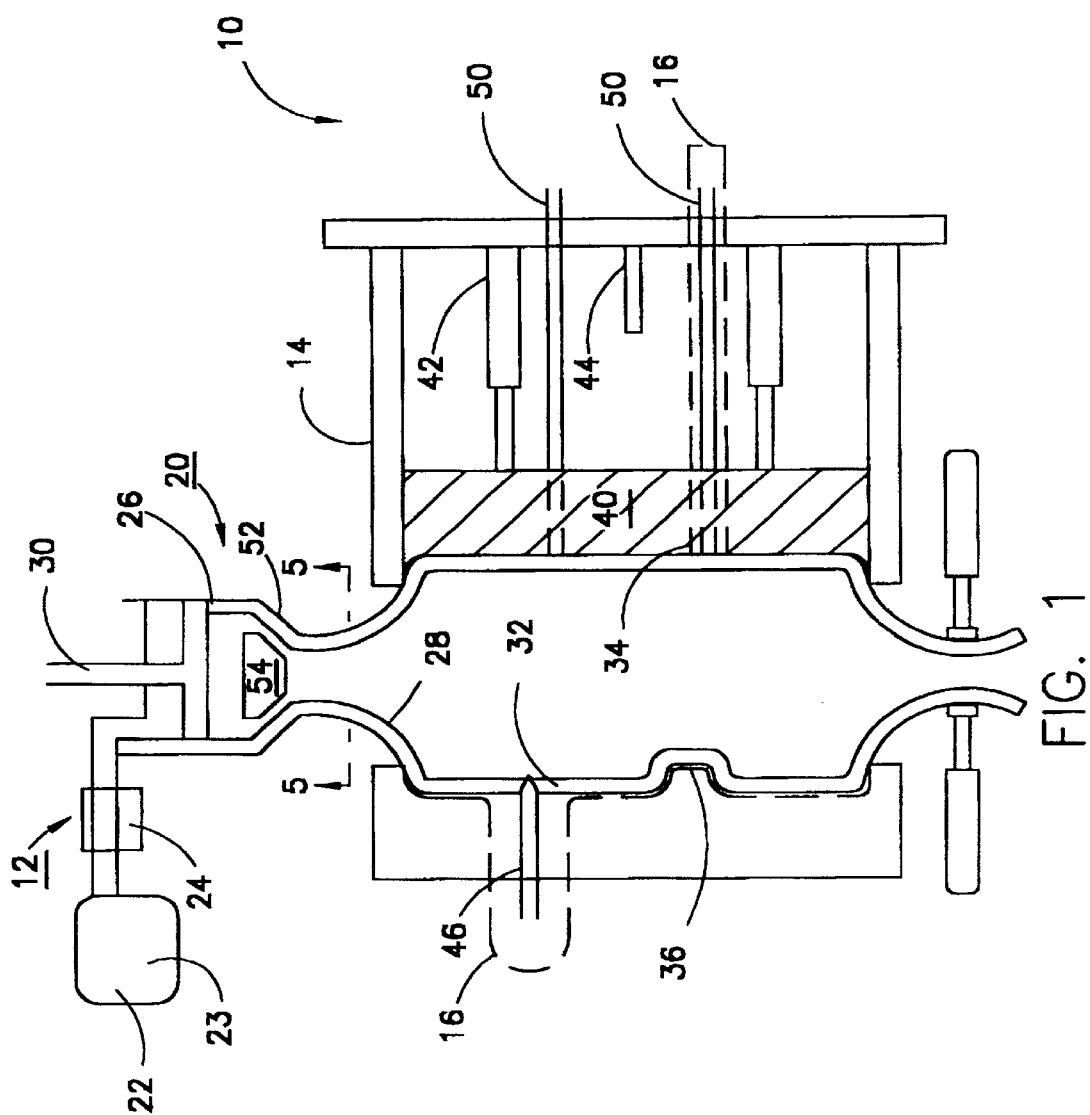
FIG. 1 is a schematic side view of a molding apparatus constructed according to the present invention in its opened position.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Referring now to the drawings in general and FIG. 1 in particular, it will be understood that the illustrations are for the purpose of describing a preferred embodiment of the invention and are not intended to limit the invention thereto.

DESCRIPTION OF THE MOLDING APPARATUS

As best seen in FIG. 1, a molding apparatus, generally designated 10, is shown constructed according to the present invention. The molding apparatus 10 includes four major subassemblies: a preformer 12; an asymmetrical core 14; a differential pressure system 16; and parison former 20.

The preformer 12 provides molten material 22 to asymmetrical core 14. The preformer 12 includes a molten material supply 22 and a pump 24. In the preferred embodiment, the preformer 12 may include an accumulator 26 for receiving a predetermined amount of molten material 28 by means of pump 24. Accumulator 26 may further include a pusher 30 for forcing the molten material 28 from the accumulator through a parison former 20. The parison former 20 forms the molten material into a hollow, partially solidified, parison tube of material 28. The hollow tube 28 extends downward is received by the asymmetrical core 14.

In the preferred embodiment, the molten material is a thermoplastic material such as a high-density polyethylene. In addition, in the preferred embodiment pump 24 may be an extruder which receives solid pellets of thermoplastic material; heats the thermoplastic material to above its melting; and provides the molten material to the accumulator 26.

The asymmetrical core 14 includes a first cavity 32 and a second, female cavity 34 separated by a parting line. Unlike prior art blow molding cores, the depth ratio of the second, female cavity may be greater than 4:1 with respect to the first cavity 32. This very high depth ratio is accomplished by a movable bottom plate 40 located within second female cavity 34. The movable bottom plate 40 includes at least one inner intermittent stop 44 which allows the molten material to form bottom and critical bottom edges of the molded article. In a preferred embodiment, there could be a plurality of stops 44 spaced along the sides of second, female cavity 34.

The present invention also includes a returning means 42 for moving the movable bottom plate 40 back to its original position. In the preferred embodiment, returning means 42 is at least one hydraulic cylinder. Since returning means 42 is operable to move the entire bottom plate 40 and, thereby help eject the molded product, it may not be necessary that the sidewalls of the molten article be tapered as has been previously required to allow the molded part to be removed from the core 14. Accordingly, in the preferred embodiment of the present invention, the sidewalls of the second female, cavity are essentially taper free.

While first cavity 32 is preferably a female cavity also, it may include a male portion 26 which can be useful for forming, for example, reinforcing ribs along one surface of the molded article. However, the actual depth of first cavity 32 could be substantially equal to 0! For molding the dock float of the present invention, the depth of first cavity 32 is only about ½ of an inch and the final depth of the second cavity 34 is about 20 inches. This produces a depth ratio of about 40 which is about 10 times what has previously been achievable. This can best be seen by referring to Table 1, below. In the following examples, thinning score refers to the acceptability of the thickness of the bottom and sidewalls of a molded article in which one side of the mold core is ½ inch and the other side is increased incrementally.

TABLE 1

| Example | Depth Ratio | Thinning Score | Flange |
|---|---|---|---|
| Conventional Blow Molding | 1 | 5 | NO |
| | 2 | 5 | NO |
| | 4 | 3 | NO |
| | 8 | 2 | NO |
| | 16 | 0 | NO |
| | 32 | 0 | NO |
| | 64 | 0 | NO |
| | 128 | 0 | NO |
| Present Invention | 1 | 5 | YES |
| | 2 | 5 | YES |
| | 4 | 5 | YES |
| | 8 | 5 | YFS |
| | 16 | 5 | YES |
| | 32 | 5 | YES |
| | 64 | 5 | YES |
| | 128 | 5 | YES |

As can be seen, the thinning score of the present invention remains substantially constant over an extremely large depth ratio when compared to conventional blow molding which was not able to produce an acceptable part for a depth ration of greater than about 4 or produce a part having a flange at one end. As can be seen in Table 2, other molding techniques such as vacuum, twin sheet, and rotational molding also did not produce similar results to that achieved by the present invention.

TABLE 2

| Example | Depth Ratio | Thinning Score | Flange |
|---|---|---|---|
| Vacuum Molding | 1 | 5 | YES |
| | 2 | 5 | YES |
| | 4 | 3 | YES |
| | 8 | 2 | YES |
| | 16 | 0 | YES |
| | 32 | 0 | YES |
| | 64 | 0 | YES |
| | 128 | 0 | YES |
| Twin Sheet Molding | 1 | 5 | YES |
| | 2 | 5 | YES |
| | 4 | 3 | YES |
| | 8 | 2 | YES |
| | 16 | 0 | YES |
| | 32 | 0 | YES |
| | 64 | 0 | YES |
| | 128 | 0 | YES |
| Rotational Molding | 1 | 5 | NO |
| | 2 | 5 | NO |
| | 4 | 5 | NO |
| | 8 | 5 | NO |
| | 16 | 5 | NO |
| | 32 | 5 | NO |
| | 64 | 5 | NO |
| | 128 | 5 | NO |

As can be seen, the present invention having a movable bottom plate is able to form an acceptable molded product having a flange at one end and having a much higher depth ratio than has been achieved by the competitive prior art processes.

Also, in the preferred embodiment, a pressure differential system 16 may be used to draw the semi-molten material 28 into the asymmetrical core 14. The differential pressure provided by the pressure differential system 16 forces the material into first cavity 32 and second cavity 34. And the preferred embodiment, the pressure differential system 16 includes a pressurized gas source 46 which penetrates the surface of the parison tube material 28 and introduces high-pressure gas at about 100 PSI. In addition, the pressurized gas 46 may be supplemented by further including a vacuum source 50 interconnected to the walls of the first and second cavity's 32,34.

Figure 5B:
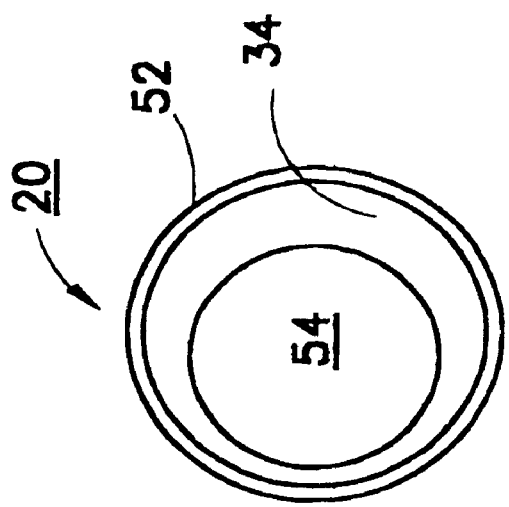
FIGS. 5A and 5B is a cross-sectional view of the parison forming mandrel in FIG. 1, taken along lines 5—5.
Figure 5A:
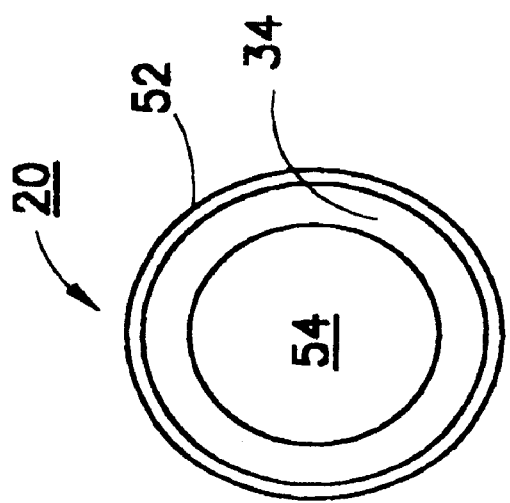

In the preferred embodied, parison former 20 may include an outer die 52 and an inner mandrel 54 for forming the parison tube. As best seen in FIG. 5, the outer die 52 and inner mandrel 54 may be concentrically spaced as shown in FIG. 5a or be asymmetrically spaced walls 58 as shown in FIG. 5b. The variable spacing shown in FIG. 5b allows more material to be sent to one portion of the asymmetrical core 14 than the other portion. In the preferred embodiment, the geometry of the parison former 20 is generally proportional to the final molded product formed within the asymmetrical core 14.

Figure 2:
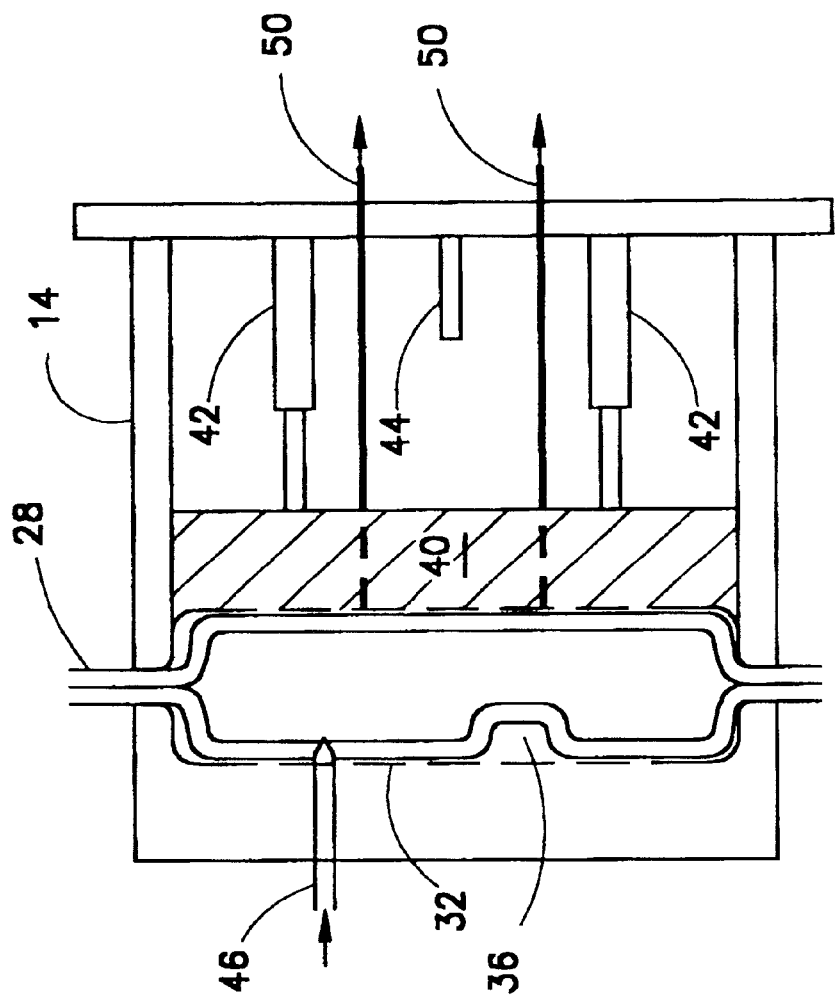
FIG. 2 is a schematic side view of the molding apparatus shown in FIG. 1 in its closed position before the bottom plate moves.
Figure 3:
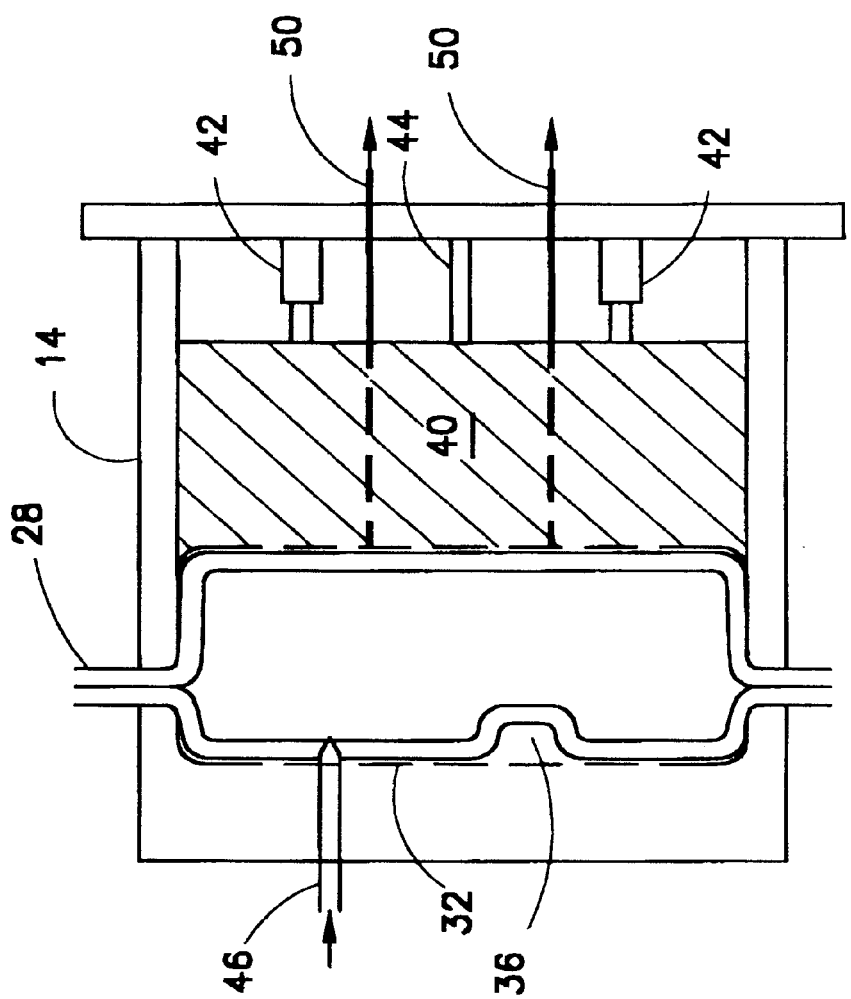
FIG. 3 is a schematic side view of the molding apparatus shown in FIG. 1 in its closed position with the bottom plate moved to its fully extended position.
Figure 4:
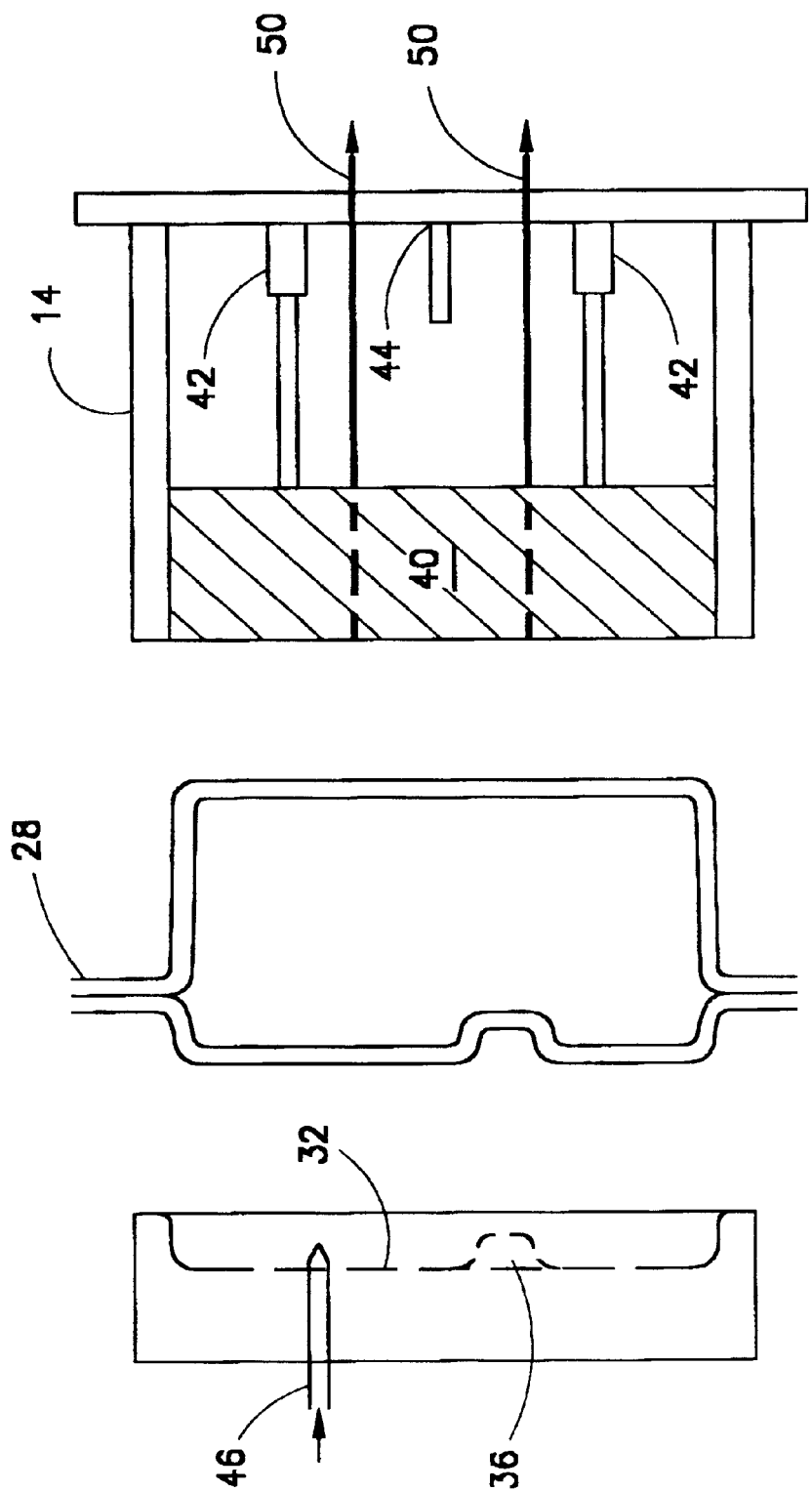
FIG. 4 is a schematic side view of the molding apparatus shown in FIG. 1 in its open position with the bottom plate returned to its initial starting position.

In operation, preformer 12 provides molten material 22 to asymmetrical core 14 from molten material supply 22 and pump 24 to accumulator 26. Pusher 30 forces the molten material 28 from the accumulator through a parison former 20. The parison former 20 forms the molten material into a hollow, partially solidified, parison tube of material 28 extends downward and is received by the asymmetrical core 14. As best seen in FIG. 2, the first cavity 32 and second, female cavity 34 close onto the parison tube and the a pressure differential system 16 forces the semi-molten material 28 into first cavity 32 and second cavity 34 by means of pressurized gas source 46 which penetrates the surface of the parison tube material 28 and introduces high-pressure gas at about 100 PSI and by vacuum source 50 that is interconnected to the walls of the first and second cavity's 32,34. Turning to FIG. 3, after this operation is completed, movable bottom plate 40 located within second female cavity 34 is retracted away from the parting line to inner intermittent stop 44 which allows the molten material to form bottom and critical bottom edges of the molded article. As best seen in FIG. 4, after the movable bottom plate has reached its furthest position away from the parting line, the molten material 28 is allowed to solidify further. Then, returning means 42 moves the movable bottom plate 40 back to its original position which aids in ejecting the molded product.

DESCRIPTION OF THE MOLDED FLOAT

As best seen in FIG. 6, floating dock system 110 includes a docking surface 112 and a series of interlocked blow molded floats 114. The docking surface 112 may be formed from a variety of water and weather resistant materials, such as marine plywood, rigid plastic sheeting, a vinyl sheet or a composite. Multiple sheets of material having interlocking edges 122 may also be used to form the docking service 112. Alternatively, the docking surface 112 may be constructed from planking formed from either of treated wood or composite material. Stringers 120 may be used to connect such planking to the underlying blow molded floats 114.

Figure 7:
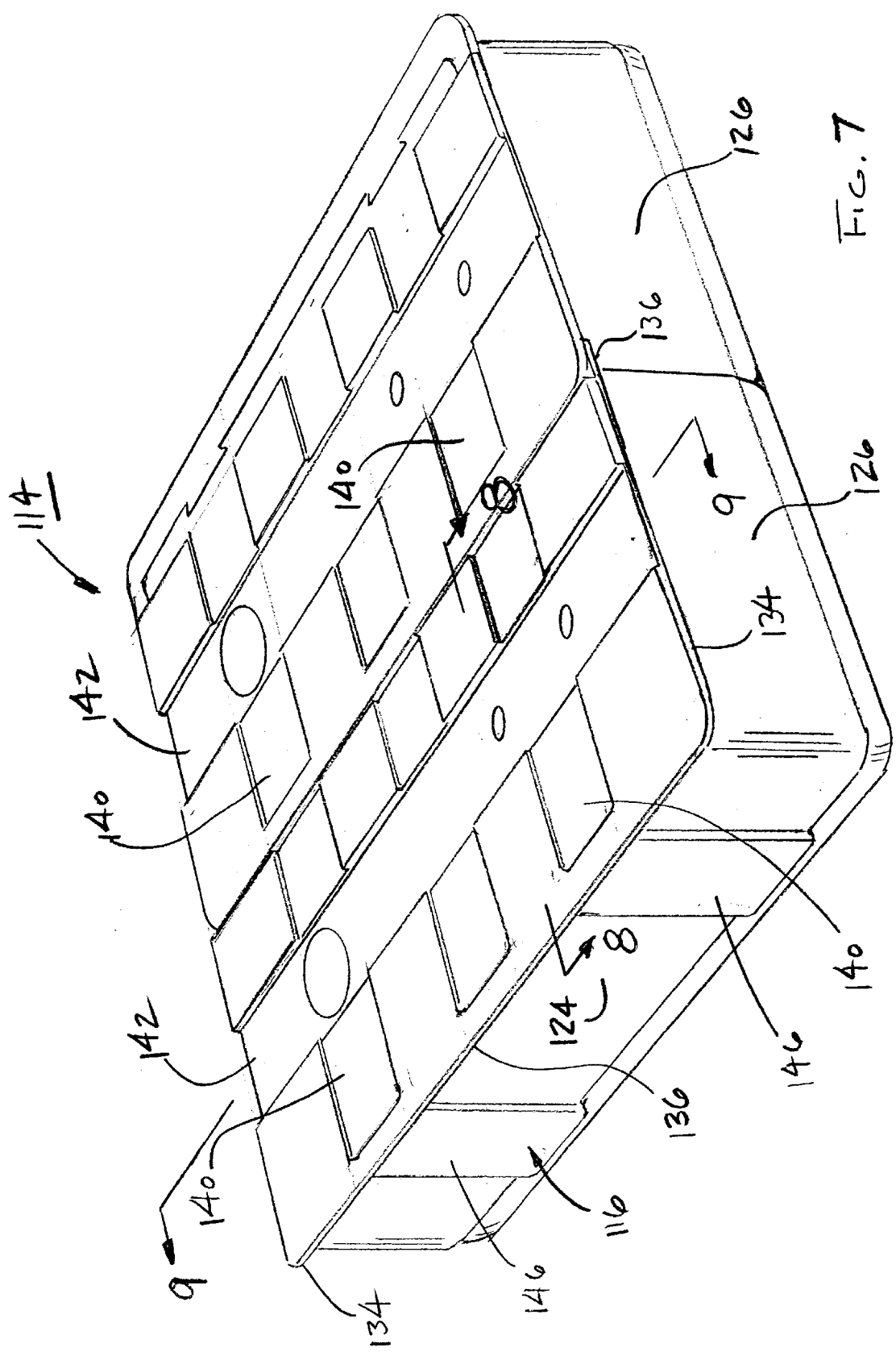
FIG. 7 is a top perspective view of two individual float units coupled together.

Two blow molded floats 114 are shown coupled together in a prospective view in FIG. 7. Each blow molded float 114 includes short sides 126 and long sides 124. The blow molded float 114 is preferably rectangular in shape. Each blow molded float 114 includes two short side walls 126 and two long side walls 124, as well as a bottom 130 and a thickened top mounting surface 132. In the preferred embodiment, each blow molded float 114 has a width of about 2 feet, a length of about 4 feet and a depth of about 20 inches. The depth ratio of the blow molded float 114 of the preferred embodiment is greater than about 4:1.

Walls 124 and 126 of the blow molded float 114 are substantially taper free. The thickened top mounting surface 132 of the blow molded float 114 includes an integrally mounted flange 134 that is integrally molded to the top surface 132. The integrally mounted flange 134 extends beyond at least two edges of the thickened top mounting surface 132, and in the preferred embodiment, an integrally mounted flange 134 also extends beyond a third edge 136 of the thickened top mounting surface 132. The thickened top mounting surface 132 also includes ribbing 140, which helps prevent warping of the thickened top mounting surface 132.

Figure 12:
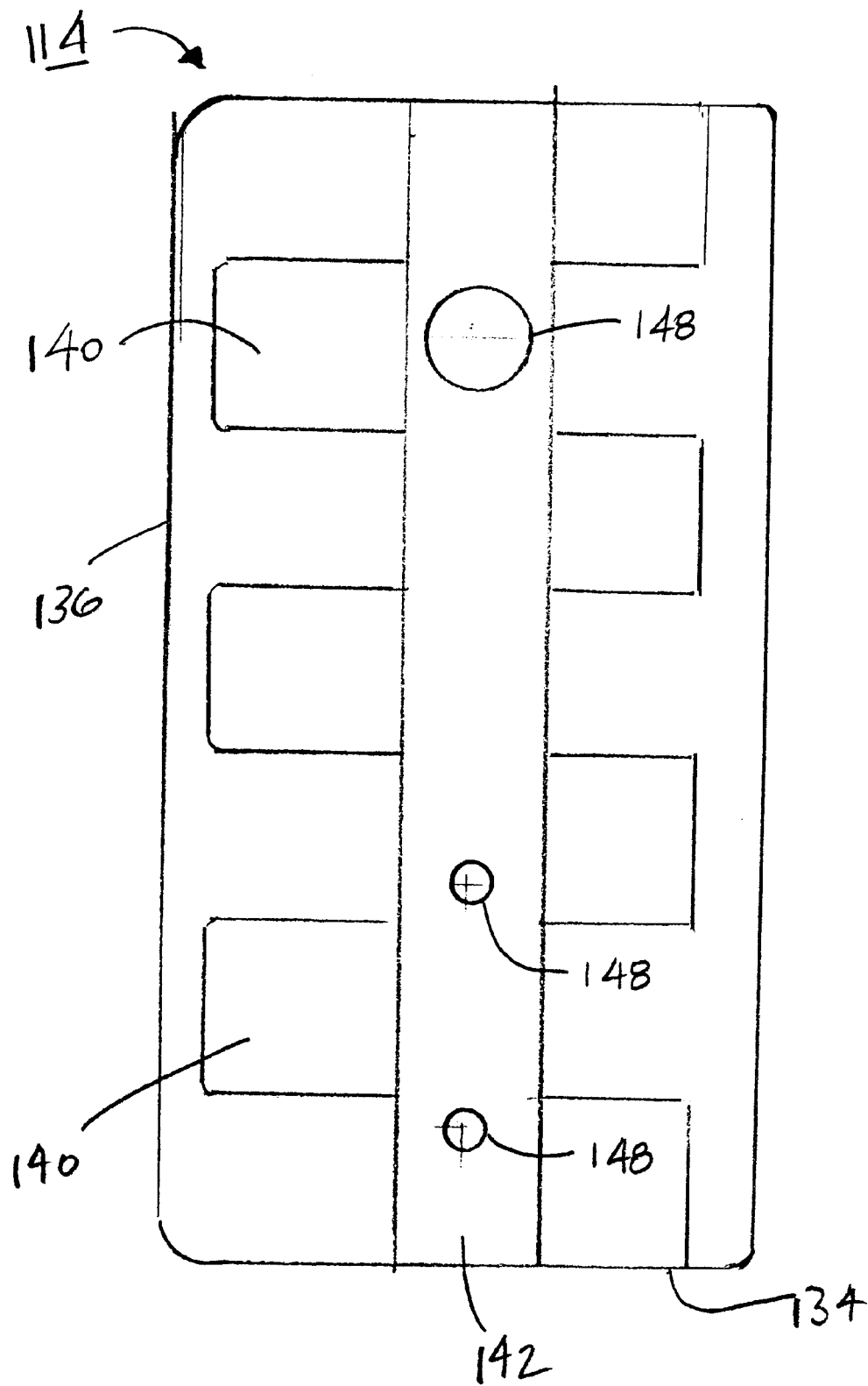
FIG. 12 is a top view of the blow molded float shown in FIG. 8.

A utility channel 142 running lengthwise along the center of the thickened top mounting surface 132 is also included in the preferred embodiment. The utility channel 142 allows wiring to be strung along the length of the coupled blow molded floats 114 to the end of the dock system 110. The utility channel 142 runs along the length of the thickened top mounting surface 132. The thickened top mounting surface 132, integrally molded flange 134, ribbing 140 and utility channel 142 can be seen in top and cross-sectional side views in FIGS. 12 and 9, respectively.

Figure 8:
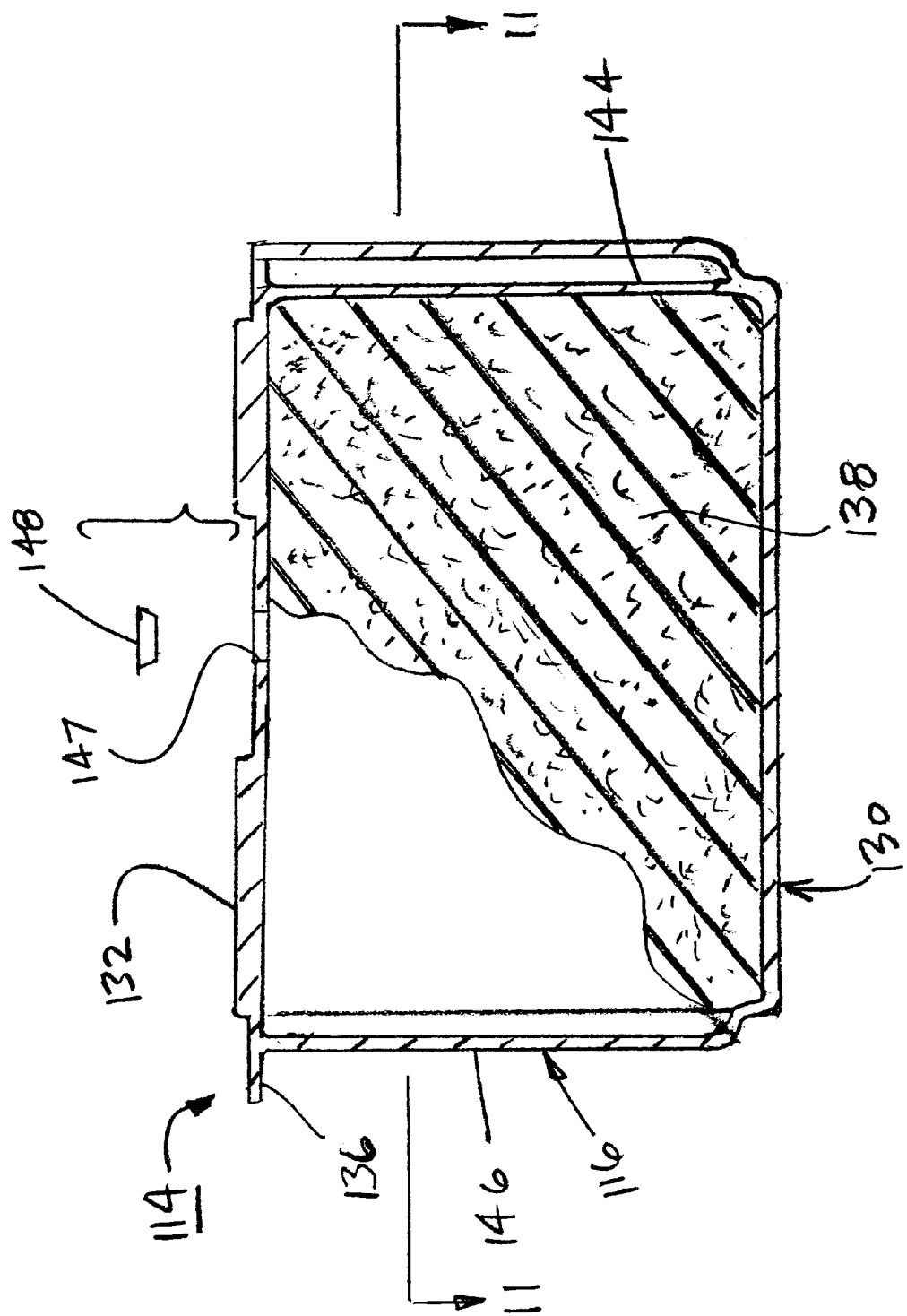
FIG. 8 is an end view of an individual blow molded float.

To increase the buoyancy of the floating dock system 110, the blow molded float 114 may be filled with a low density foam 144. The blow molded float has an interior cavity that can be accessed by at least one aperture, which is preferably located in the utility channel 142. As seen in FIG. 8, which is a cross-sectional view of a blow molded float 114, the low density foam 144 substantially fills the interior cavity of the interior of the float. In the preferred embodiment, the low density filling 144 is introduced into the interior cavity of the blow molded float 114 through at least one aperture 145. Also, in the preferred embodiment, additional, preferably smaller apertures 147 allow air to escape from the interior of the blow molded float 114 during the filling process. In the preferred embodiment, the apertures 145, 147 are sealed by plugs 148 after filing. The low density filling 144 may be a closed-cell foam. In the preferred embodiment, expandable polystyrene is used as the low density filling 144.

An interlocking coupling means 116 permits a plurality of blow molded floats 114 to be joined together to form a continuous array. The interlocking coupling means 116 is preferably a tongue-and-groove system located on opposing side walls 124, wherein the male tongue 144 located on one blow molded float 114 cooperates with a female groove 146 on and adjacent blow molded float 114.

The orientation of the interlocking coupling means 116 is shown in FIGS. 10 and 11, which are a side view of a blow molded float 114 and a cross-sectional view of a blow molded float 114, respectively. The tongue-and-groove male 144 and female 146 portions of the interlocking coupling means 116 are substantially taper free.

Adjacent blow molded floats 114 can be coupled together by positioning the male portion 144 of the tongue-and-groove coupling of one blow molded float in alignment with the female portion 146 of the tongue-and-groove coupling means of an adjacent float. The integrally molded flange 134 of the first blow molded float 114 overlaps the thickened top-mounted surface 132 of the second blow molded float 114 such that the integrally molded flange 134 rests on a portion of the thickened top-mounted surface 132 that does not have an integrally mounted flange 134, i.e. a recess portion.

Once an array of interlocking blow molded floats 114 has been assembled, the interlocking blow molded floats 114 can be a mated to the docking surface in order to form a floating dock 110. Mating can be accomplished by bolting in the docking surface 112 to the integrally mounted flange 134 portions of the blow molded floats 114.

Certain modifications and improvements will occur to those skilled in the art upon a reading of the foregoing description. By way of example, other methods for interlocking floats, such as running bolts through the floats and various types of differently configured interlocking shapes, such as a male ½ diameter sliding into a female ½ diameter or a plug with a ledge forced into a female hole with a lip could be molded by adding additional moving parts in the mold. Also, the present invention can be bolted together with or without a dovetail or other configurations of interlocks by driving lag bolts directly through a substantially, solid flange which can be formed into the thickened top of an adjacent float having a recess, thereby locking the two floats together. Finally, while the mating surfaces are shown preferably along the long side, they could be on any side, such as shown in FIG. 6. It should be understood that all such modifications and improvements have been deleted herein for the sake of conciseness and readability but are properly within the scope of the following claims.

I claim:

1. A floating dock system, said floating dock system comprising:
   (a) a docking surface;
   (b) at least one blow molded float, said blow molded float having integrally formed, seamless top, bottom, and sides, wherein said sides, said bottom and said top form an internal cavity; and
   (c) a first side of one of said blow molded floats includes a male tongue portion, said male tongue portion being mateable with an opposing female groove disposed on one of said sides of an adjacent blow molded float.

2. The floating dock system according to claim 1, further including an interlocking coupling means for joining a plurality of adjacent blow molded floats to one another.

3. The floating dock system according to claim 2, wherein said interlocking coupling means is a tongue-in-groove system.

4. The floating dock system according to claim 3, wherein each of said blow molded floats includes said tongue-in-groove system.

5. The floating dock system according to claim 1, wherein said male tongue portion and said opposing female groove are substantially taper free.

6. The floating dock system according to claim 1, wherein said docking surface includes planking.

7. The floating dock system according to claim 6, further including stringers for attaching said planking to said blow molded floats, said stringers extending vertically from said planking.

8. The floating dock system according to claim 1, wherein said docking surface includes at least one piece of sheeting.

9. The floating dock system according to claim 8, wherein adjacent pieces of said sheeting are joined along at least one common interlocking edge.

10. The floating dock system according to claim 1, wherein said docking surface is selected from water and weather resistant materials, including marine plywood, rigid plastic sheeting, a vinyl sheet, or a composite.

11. A floating dock system, said floating dock system comprising:
    (a) a docking surface;
    (b) at least one blow molded float, said blow molded float having integrally formed, seamless top, bottom, and sides, wherein said sides, said bottom and said top form an internal cavity and wherein said sidewalls are substantially taper-free; and
    (c) a first side of one of said blow molded floats includes a male tongue portion, said male tongue portion being mateable with an opposing female groove disposed on one of said sides of an adjacent blow molded float.

12. The floating dock system according to claim 11, wherein said blow molded float is rectangular-shaped.

13. The floating dock system according to claim 12, wherein said blow molded float has a width dimension of about 2 feet, a length dimension of about 4 feet, and a depth of between about 4 and 20 inches.

14. The floating dock system according to claim 11, wherein said thickened top mounting surface further includes an integrally molded flange, said integrally molded flange extending horizontally beyond at least one of said sidewalls.

15. The floating dock system according to claim 14, wherein said integrally molded flange extends horizontally beyond at least two of said sidewalls.

16. The floating dock system according to claim 15, wherein said integrally mounted flange extends horizontally beyond at least three of said sidewalls.

17. The floating dock system according to claim 13, wherein said cavity is filled with a low-density filling.

18. The floating dock system according to claim 17, wherein said low-density filling is a closed cell foam.

19. The floating dock system according to claim 18, Wherein said closed cell foam is expandable polystyrene.

20. The floating dock system according to claim 11, wherein said thickened top mounting surface further includes ribbing to prevent warping of said thickened top mounting surface during molding.

21. The floating dock system according to claim 11, wherein said thickened top mounting surface further includes a utility channel.

22. A floating dock system, said floating dock system comprising:
    (a) a docking surface;
    (b) at least one blow molded float, said blow molded float having integrally formed, seamless top, bottom, and sides, wherein said sides, said bottom and said top form an internal cavity and wherein said sidewalls are substantially taper-free;
    (c) an interlocking coupling means for joining a plurality of adjacent blow molded floats to one another; and
    (d) a first side of one of said blow molded floats includes a male tongue portion, said male tongue portion being mateable with an opposing female groove disposed on one of said sides of an adjacent blow molded float.

23. The floating dock system according to claim 22, wherein said interlocking coupling means is a tongue-in-groove system.

24. The floating dock system according to claim 23, wherein each of said blow molded floats includes said tongue-in-groove system.

25. The floating dock system according to claim 22, wherein said male tongue portion and said opposing female groove are substantially taper free.

26. The floating dock system according to claim 22, wherein said docking surface includes planking.

27. The floating dock system according to claim 26, further including stringers for attaching said planking to said blow molded floats, said stringers extending vertically from said planking.

28. The floating dock system according to claim 22, wherein said docking surface includes at least one piece of sheeting.

29. The floating dock system according to claim 28, wherein adjacent pieces of said sheeting are joined along at least one common interlocking edge.

30. The floating dock system according to claim 22, wherein said docking surface is selected from water and weather resistant materials, including marine plywood, rigid plastic sheeting, a vinyl sheet, or a composite.

31. The floating dock system according to claim 22, wherein said blow molded float is rectangular-shaped.

32. The floating dock system according to claim 31, wherein said blow molded float has a width dimension of about 2 feet, a length dimension of about 4 feet, and a depth of between about 4 and 20 inches.

33. The floating dock system according to claim 31, wherein said thickened top mounting surface further includes an integrally molded flange, said integrally molded flange extending horizontally beyond at least one of said sidewalls.

34. The floating dock system according to claim 33, wherein said integrally molded flange extends horizontally beyond at least two of said sidewalls.

35. The floating dock system according to claim 34, wherein said integrally mounted flange extends horizontally beyond at least three of said sidewalls.

36. The floating dock system according to claim 31, wherein said cavity is filled with a low-density filling.

37. The floating dock system according to claim 36, wherein said low-density filling is a closed cell foam.

38. The floating dock system according to claim 37, wherein said closed cell foam is expandable polystyrene.

39. The floating dock system according to claim 22, wherein said thickened top mounting surface further includes ribbing to prevent warping of said thickened top mounting surface during molding.

40. The floating dock system according to claim 22, wherein said thickened top mounting surface further includes a utility channel.

41. The floating dock system according to claim 33, wherein said flange is substantially solid.

* * * * *